United States Patent [19]

Ungchusri et al.

[11] Patent Number: 4,576,385
[45] Date of Patent: Mar. 18, 1986

[54] FLUID PACKING ASSEMBLY WITH ALTERNATING DIVERSE SEAL RING ELEMENTS

[75] Inventors: Tep Ungchusri, The Woodlands; William J. Jakubowski, Houston, both of Tex.

[73] Assignee: FMC Corporation, Chicago, Ill.

[21] Appl. No.: 753,296

[22] Filed: Jul. 9, 1985

Related U.S. Application Data

[63] Continuation-in-part of Ser. No. 680,070, Dec. 12, 1984, Pat. No. 4,527,806.

[51] Int. Cl.$^4$ .............................................. F16J 15/18
[52] U.S. Cl. ..................................... 277/124; 277/125; 277/205
[58] Field of Search ................ 277/102, 123–125, 277/205, 206 R

[56] References Cited

U.S. PATENT DOCUMENTS

| | | | |
|---|---|---|---|
| 1,246,089 | 11/1917 | Greenoe | 277/124 |
| 2,912,266 | 11/1959 | Nordell | 277/125 X |
| 3,554,563 | 1/1971 | Schumacher et al. | 277/124 |
| 3,586,341 | 6/1971 | Whittaker et al. | 277/124 |
| 4,006,881 | 2/1977 | Gaillard | 277/124 X |
| 4,244,192 | 1/1981 | Chellis | 277/205 X |
| 4,398,731 | 8/1983 | Gorman et al. | 277/205 X |
| 4,474,382 | 10/1984 | Hjelsand | 277/123 X |

Primary Examiner—Robert S. Ward
Attorney, Agent, or Firm—W. William Ritt, Jr.; Richard B. Megley

[57] ABSTRACT

A fluid packing comprising a stacked assembly of V-ring seal elements, special backup/energizing rings interspersed between the seal elements, and a spring-energized lip seal ring that is retained in functional position by an adapter ring having a generally tee-shaped cross-sectional configuration. As the assembly is installed in a stem packing chamber of a valve or choke, or in the packing chamber of a wellhead lockdown screw, with the T-adapter ring at one end of the assembly and a backup ring for the V-ring seal elements at the other end, the lip seal ring and the V-ring seal elements are radially compressed to establish an initial seal between the stem or screw and the chamber wall. When the assembly is subjected to internal valve, choke or wellhead pressure, the V-ring seal elements and the lip seal ring are additionally compressed and deformed to fill annular spaces that may still exist between the seal elements, their backup/energizing rings and the lip seal ring, thereby establishing an essentially void-free dynamic packing between the stem or screw and the chamber wall that is capable of withstanding a large amount of stem or screw movement.

7 Claims, 6 Drawing Figures

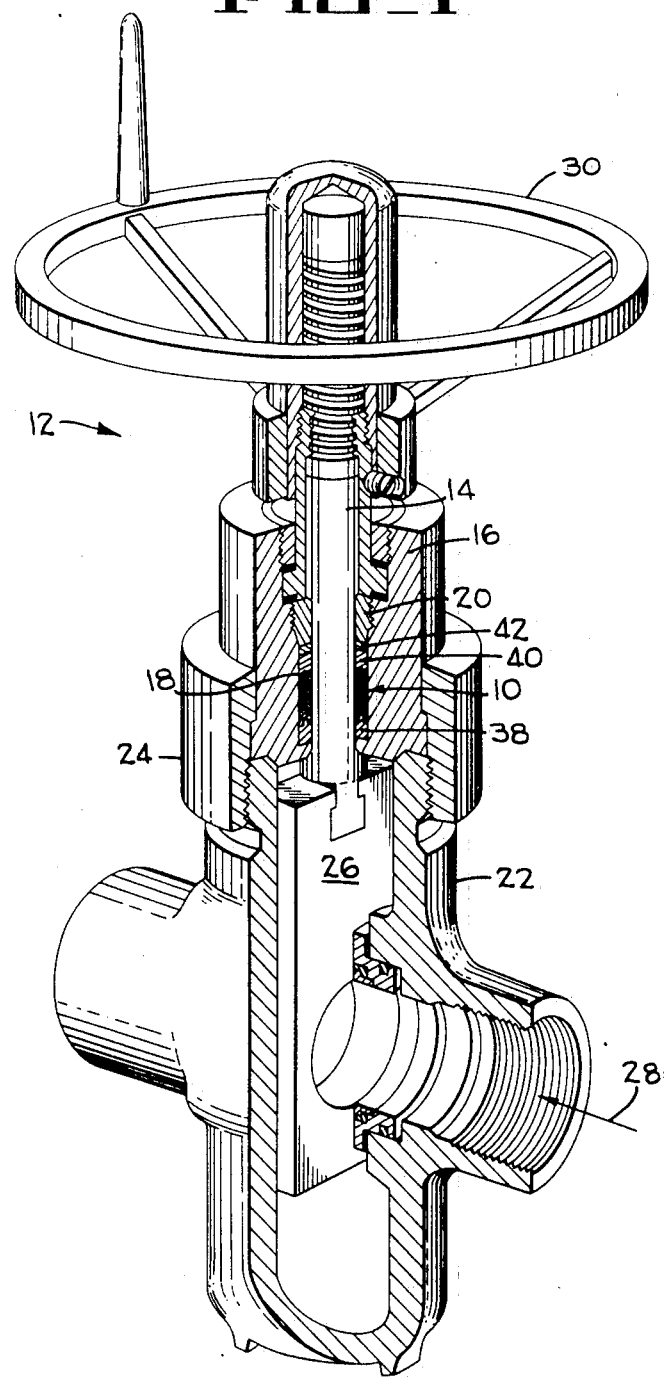
FIG_1

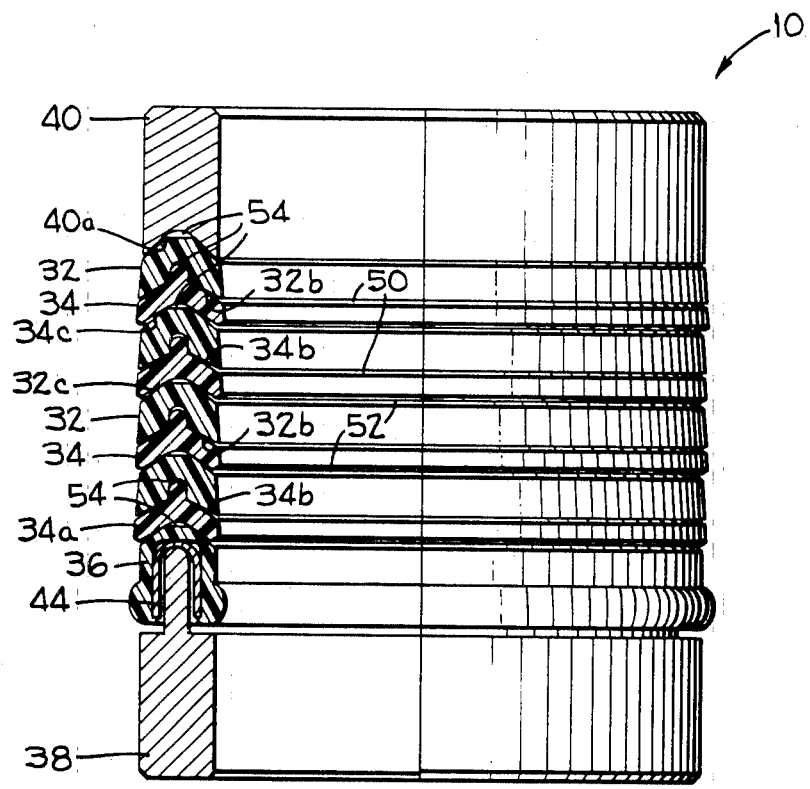
FIG_2

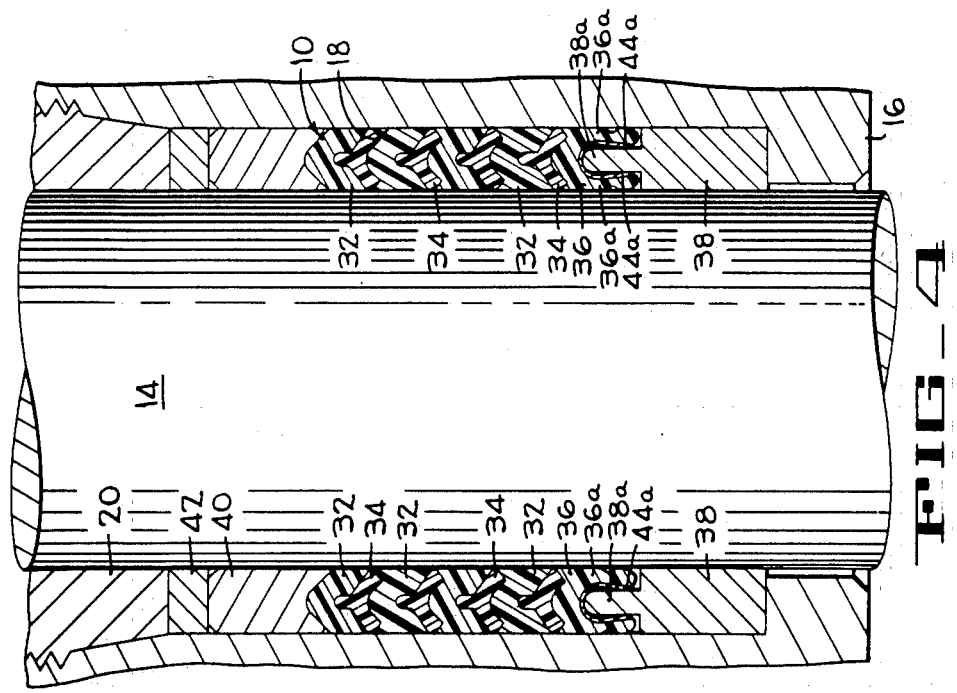
FIG_4
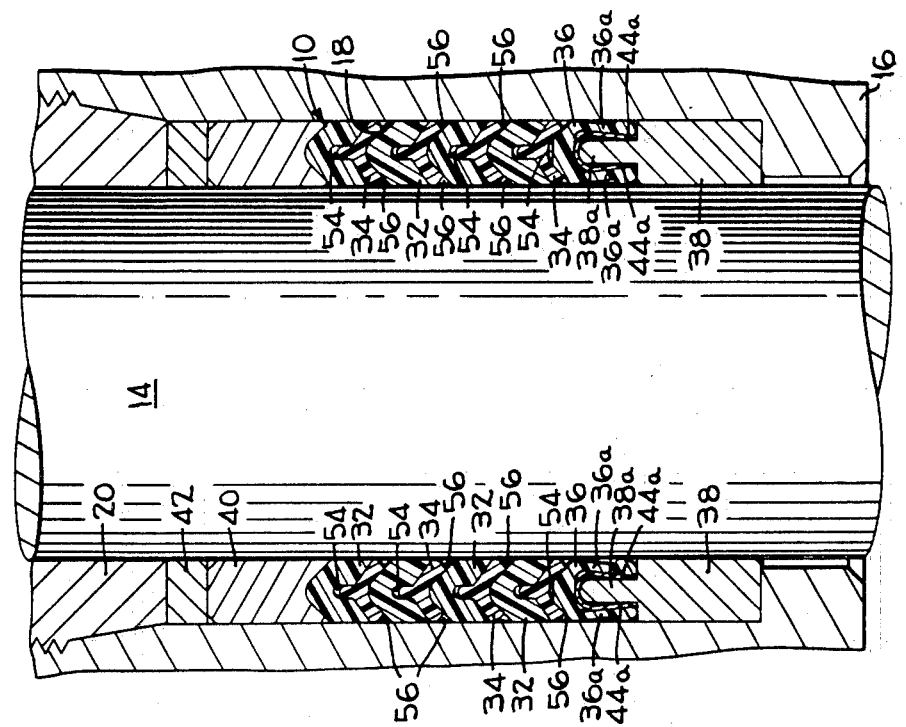
FIG_3

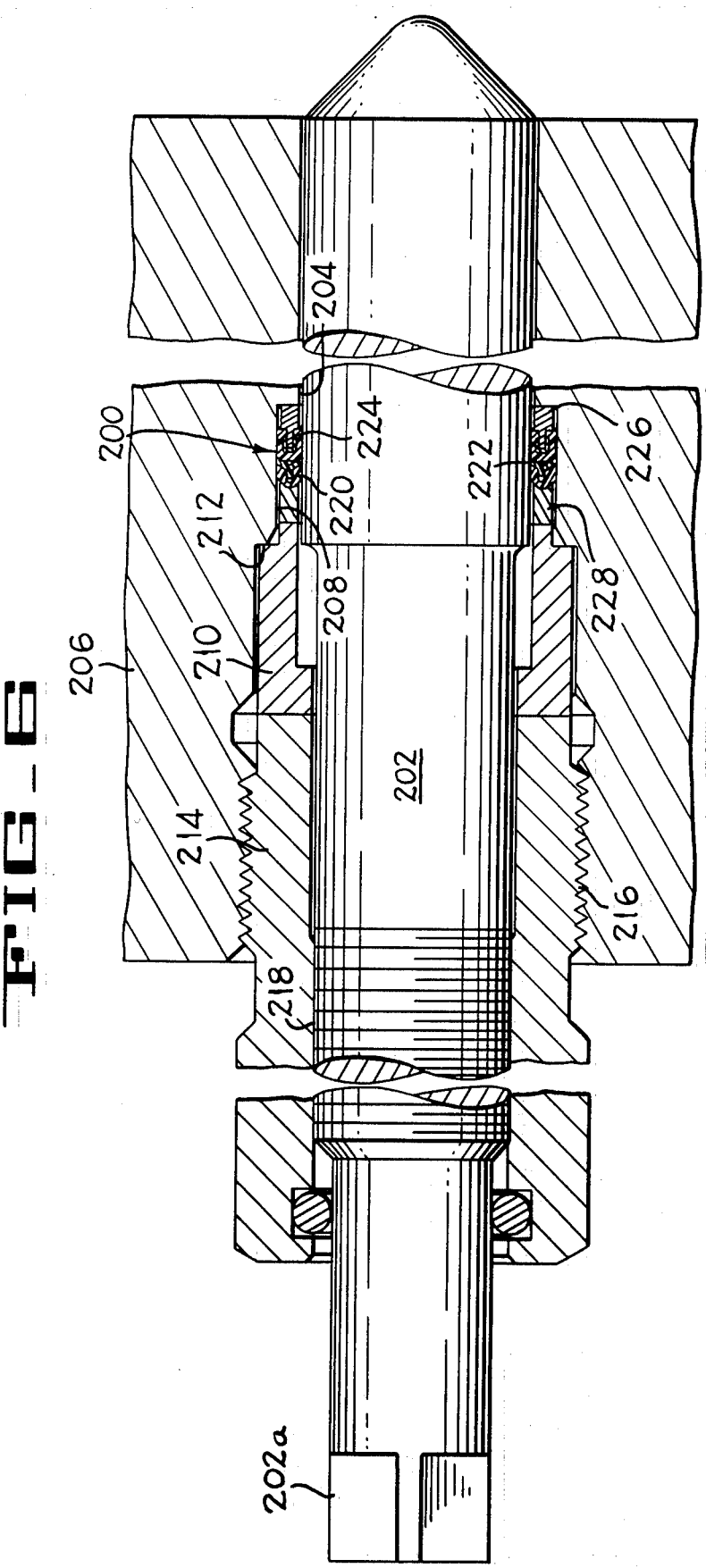

FLUID PACKING ASSEMBLY WITH ALTERNATING DIVERSE SEAL RING ELEMENTS

CROSS-REFERENCE TO RELATED APPLICATION

This application is a continuation-in-part of our co-pending application Ser. No. 680,070, filed Dec. 12, 1984, entitled VALVE STEM PACKING, now U.S. Pat. No. 4,527,806, issued July 9, 1985.

This invention relates generally to fluid seals, and more particularly to packings for providing a high pressure fluid seal between a valve or choke stem and the bonnet or other element surrounding the stem and choke and also between a wellhead lockdown screw and the wellhead through which the screw extends.

BACKGROUND

Although fluid valve and choke stem packings and wellhead lockdown screw packings constructed of elastomeric materials are known to be satisfactory for a variety of conditions, such packings do not provide the desired sealing function when subjected to high pressure gas environments, their failure being due to the phenomenon known as "explosive decompression". Replacing elastomeric materials with non-elastomers eliminates the "explosive decompression" problem, but non-elastomers creep when subjected to pressure and then do not return to their original condition when the pressure is removed, i.e., they have no memory. Due to the creep problem and the difference in the coefficient of thermal expansion of non-elastomers and the metallic packing gland and stem of a valve, conventional non-elastomeric stem packings leak after subjection to a pressure and temperature cycle.

In attempts to overcome the foregoing problems non-elastomeric lip seals have been provided with spring energizers to bias the sealing lips against the opposing metallic surface. Such a design is effective where the metallic surface is very smooth, but if the sealing lip is scratched or otherwise slightly damaged it will leak. Spring energized seals cannot be stacked in series to increase reliability unless a cartridge or other carrier is provided to contain them, but the carrier constitutes an undesirable additional part that adds to the cost, creates another potential leak path in the system, and necessitates enlargement of the packing gland and packing chamber.

SUMMARY OF THE INVENTION

The foregoing and other problems are solved by the present invention which, broadly considered, is embodied in a fluid packing comprising a stacked assembly of V-ring seal elements, special backup/energizing rings interspersed between the seal elements, and a spring-energized lip seal ring that is retained in functional position by an adapter ring having a generally tee-shaped cross-sectional configuration. As the assembly is installed in a stem packing chamber of a valve or choke, or in the packing chamber of a wellhead lockdown screw, with the T-adapter ring at one end of the assembly and a backup ring for the V-ring seal elements at the other end, the lip seal ring and the V-ring seal elements are radially compressed to establish an initial seal between the stem or screw and the chamber wall. When the assembly is subjected to internal valve, choke or wellhead pressure, the V-ring seal elements and the lip seal ring are additionally compressed and deformed to fill annular spaces that may still exist between the seal elements, their backup/energizing rings and the lip seal ring, thereby establishing an essentially void-free dynamic packing between the stem or screw and the chamber wall that is capable of withstanding a large amount of stem or screw movement, such as many hundreds of gate valve stroke cycles (valve open to closed to open constituting one cycle), at unusually high pressures of fifteen thousand pounds per square inch and above, and unusually high temperatures of two-hundred and fifty degrees Farenheit and above. Furthermore, a fluid packing assembly according to the present invention is extrusion-free, insensitive to fluctuations in pressure and/or temperature, and exceedingly resistant to chemical attack.

BRIEF DESCRIPTION OF THE DRAWINGS

FIG. 1 is a diagrammatic view, partially in elevation and partially in vertical section, of a gate valve fitted with a stem packing assembly according to the present invention.

FIG. 2 is an enlarged view, the right half in elevation and the left half in vertical section, of a valve stem packing assembly according to the present invention, ready for installation in valve such as illustrated in FIG. 1.

FIG. 3 is an enlarged fragmentary view of the valve of FIG. 1, showing the stem packing assembly of FIG. 2 in position surrounding the valve stem.

FIG. 4 is a view like FIG. 3 but showing the packing assembly when exposed to high internal valve pressure.

FIG. 6 is a view, partially in central section, of a wellhead lockdown screw installed in a wellhead housing and sealed thereto by a packing assembly according to the present invention.

DESCRIPTION OF THE PREFERRED EMBODIMENTS

FIGS. 1–4

Figure 5:
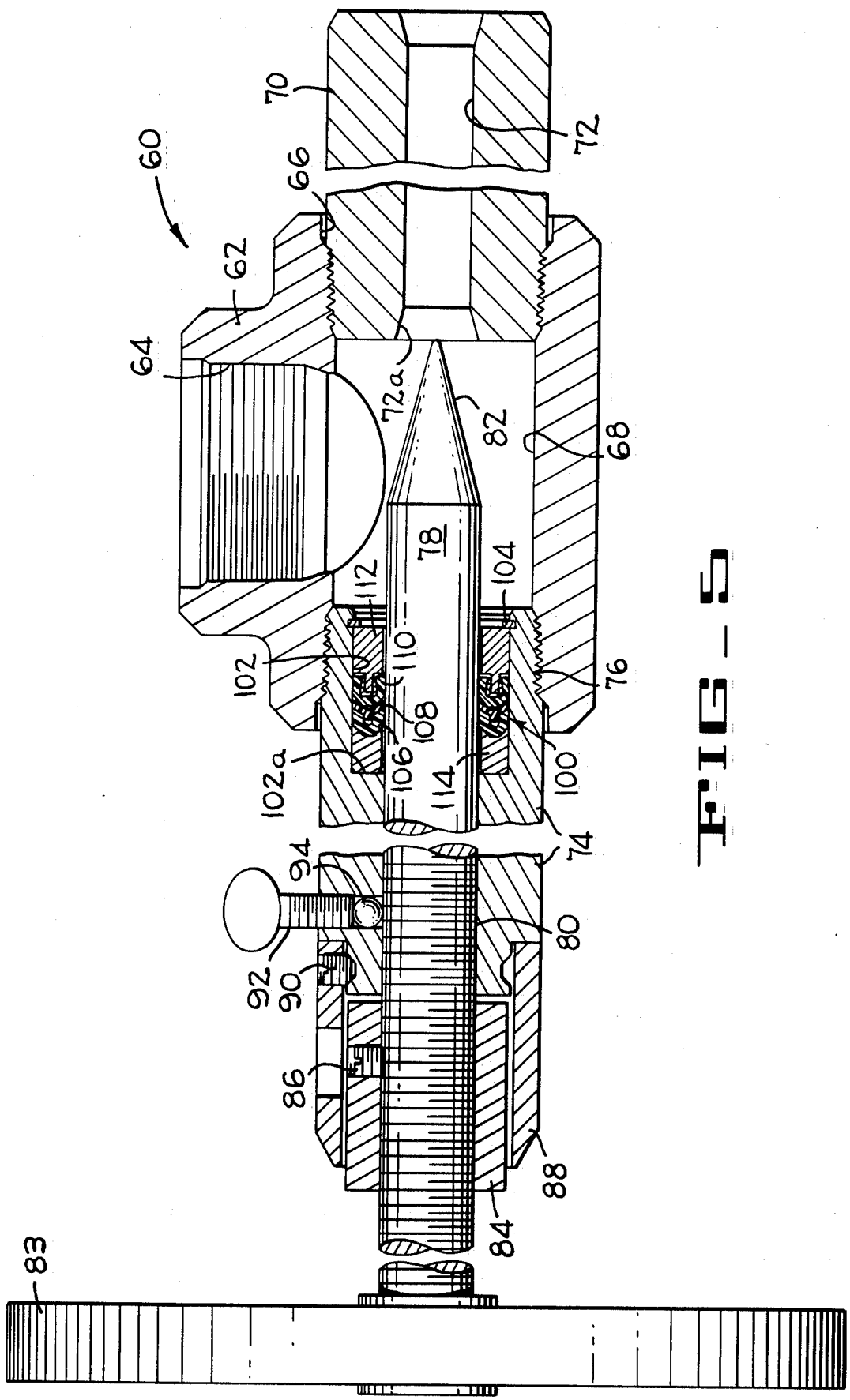
FIG. 5 is a view, partially in central section, of a fluid choke fitted with a packing assembly according to the present invention.

In accordance with the present invention, and as illustrated in FIG. 1 of the drawings, a valve stem packing assembly 10 can be employed in a rising stem gate valve 12 to provide a high pressure, high temperature dynamic seal between the valve's stem 14 and bonnet 16. In the valve 12 the packing assembly 10 is located in, and confined to, a packing chamber 18 in the bonnet 16, and a packing gland nut 20 retains the packing assembly 10 in functional position in the chamber 18. The valve 12 further includes a body 22 to which the bonnet 16 is removably secured by a threaded retainer sleeve 24, and a gate element 26 connected to the stem 14 for translatory longitudinal movement between its illustrated upper or "valve open" position and its lower or "valve closed" position (not shown) wherein it blocks the flow, represented by arrow 28, through the valve. In the conventional manner the gate 26 is suitably connected to the stem 14 so that it is raised and lowered with the stem when a handwheel 30, or other suitable means of operating the valve, is actuated.

As seen more clearly in FIGS. 2–4, the packing assembly 10 comprises a plurality of V-ring seal elements 32 in stacked array and oriented in an inverted attitude toward the valve gate 26, a like plurality of somewhat Y-shaped special backup/energizing rings 34 inverted and interspersed between and beneath the V-ring seal elements 32, a spring-energized lip seal ring 36 beneath the lowermost backup/energizing ring 34a, a lower adapter ring 38 having cross-sectional configuration generally resembling ring 38 having cross-sectional configuration generally resembling an inverted tee, and an upper adapter ring 40 with an inverted vee-shaped lower wall 40a that provides (1) a backup function to the adjacent V-ring 32, (2) a retaining function, in cooperation with the packing gland nut 20 and a spacer ring 42 (FIGS. 3 and 4), that prevents the packing assembly 10 from moving out of proper position in the chamber 18 during translation of the valve gate 26 from closed to open position, and also (3) a guide bearing function for the valve stem 14.

The preferred composition from which the V-ring seal elements 32 and the lip seal ring 36 are made is poly-tetrafluoroethylene (PTFE) filled with glass (fifteen percent) and molybdenum disulfide (five percent), and the special backup/energizing rings 34 preferably are composed of PTFE filled with carbon graphite (twenty-five percent). In order to preserve the functional integrity of the lip seal ring's U-shaped energizing spring 44, that spring preferably is constructed from a NACE (National Association of Corrosion Engineers)-approved metal such as, for example, ELGILOY which is a metallic alloy product of the Welby Clock Division of Elgin National Industries. With respect to the upper and lower adapter rings 40, 38, their preferred composition is glass-filled PEEK (polyetheretherketone) containing forty percent glass and two and one-half to five percent PPS (polyphenylene sulfide).

As shown in FIG. 2, the surfaces 32b of the V-ring seal elements 32 define an angle, with respect to the vertical, of greater magnitude than that defined by the opposed surfaces 34b of the backup/energizing rings 34, thereby establishing relatively small annular spaces or voids 50 between the elements 32 and rings 34 before the assembly 10 is installed in the packing chamber 18. Similarly, prior to installation the opposed surfaces 32c, 34c of the elements 32 and rings 34, respectively, define different angles with respect to the vertical, thereby also defining small annular spaces or voids 52 therebetween. Also as illustrated in FIG. 2, central annular spaces or voids 54 exist between the V-ring seal elements 32 and the adjacent backup/energizing rings 34, between the uppermost seal element 32 and the adaptor ring 40, and between the lowermost backup/energizing rings 34 and the lip seal ring 36, before installation of the assembly 10 in the valve 12.

As illustrated in FIG. 3, when the stem packing assembly 10 is installed in a properly sized packing chamber 18 surrounding a properly sized valve stem 14 the annular spaces or voids 50 and 52 disappear as a result of radial compression of the V-ring seal elements 32 and the backup/energizing rings 34, whereas the annular spaces or voids 54 remain. When installed as shown in FIG. 3, the seal elements 32, backup/energizing rings 34 and the adjacent surfaces of the valve bonnet 16 and the valve stem 14 define annular spaces or voids 56 of generally triangular shape in cross-section. Furthermore, when installed in the valve the lip seal ring 36 is radially compressed so that the edges 44a of the downwardly-facing energizing spring 44 deflect in the direction of the central upstanding "leg" 38a of the lower adapter ring 38.

When the packing assembly 10 is exposed to elevated internal valve pressure as shown in FIG. 4, the lips 36a of the lip seal 36 expand radially to effect an initial pressure seal with the stem 14 and the packing chamber 18, thereby facilitating the lip seal to function as a piston that transmits an axial force to the backup/energizing rings 34 and the V-ring seal elements 32, which force causes these rings and seal elements to migrate toward the adapter/ring 40. This migration causes deflection or deformation of the V-ring seal elements 32 which tend to fill the annular spaces 54, 56 and thus produce a voidless relationship between the seal elements, the backup/energizing rings 34, the lip seal ring 36, the upper adapter ring 40, the valve stem 14 and the wall of the packing chamber 18. As pressure increases the axial force transmitted to the V-ring sealing elements increases, thereby resulting in an increase in the sealing force exerted by the V-ring sealing elements against the valve stem and packing chamber wall and providing a fluid-tight, dynamic seal that will withstand many hundreds of translatory cycles of the stem at temperatures of at least 250 degrees F. and pressures of at least 15,000 psi.

FIG. 5

FIG. 5 illustrates an embodiment of the present invention in an adjustable fluid choke 60 of the type commonly used in the oil and gas industry on a well Christmas tree to control the flow of fluids emanating from the well. The choke 60 generally comprises an annular body 62 with an inlet 64 and an outlet 66 communicating with a central chamber 68, a seat element 70 threaded into the outlet 66 and having a bore 72 through which the controlled flow of fluid passes from the choke, a bonnet assembly comprising an annular bonnet body 74 threaded into the choke body 62 at 76, and a choke stem 78 threaded into the bonnet body 74 at 80. The stem 78 has a conical tip 82 that cooperates with an inlet portion 72a of the seat bore 72 to control the fluid flow through the choke, and a handle 83 or other suitable device provides a means for rotating the stem to advance or withdraw it from the seat 70. An annular indicator drum 84, secured non-rotatably to the stem 78 as by means of a set screw 86, cooperates with an indicator sleeve 88, similarly secured by a lock screw 90 to the bonnet body 74, to provide external visual indication of the position of the stem tip 82 with respect to the seat bore inlet 72a, and thus the area of the annular opening between the tip and inlet, to guage the flow through the choke. To prevent undesirable movement of the stem 78 a thumb screw 92 is provided to pressure a plastic ball 94 against the stem threads, thereby locking the stem against rotation.

The choke stem 78 is dynamically sealed to the bonnet body 74 by an annular packing assembly 100 of the present invention, this assembly residing in a packing chamber 102 between the stem and a counterbore in the bonnet body, and a snap ring 104 functions to retain the packing assembly 100 in place. Similar to the packing assembly 10 of FIGS. 1-5, the packing assembly 100 comprises one or more V-ring seal elements 106 (only one shown), one or more Y-shaped backup/energizing rings 108 (only one shown), a spring-energized lip seal ring 110, and an adapter ring 112 of generally T-shaped configuration in cross-section. The seals are arranged in a stacked array, and an adapter ring 114 is included between the V-ring seal element 106 and the opposed radial wall 102a of the chamber 102. The configuration of these packing elements and their functional response to pressure in the choke body correspond to their counterparts in the packing assembly 10.

FIG. 6

FIG. 6 illustrates yet another embodiment of the present invention, wherein a packing assembly 200 provides a static and dynamic fluid seal between a wellhead lockdown screw body 202 and a lateral port 204 in the wall of a wellhead housing 206 of the type commonly employed at an oil or gas well. The packing assembly 200 resides in a packing chamber 208 and is retained in functional position therein by a junk ring 210 which, in turn, is held in place against a radial surface 212 of the port 204 by a stuffing box nut 214 that is threaded into the wellhead housing 206 at 216. The screw body 202 is threaded into the stuffing box nut 214 at 218 so that rotation of the screw, such as by a wrench (not shown) engaging the squared outer end 202a of the screw, will advance or retract the screw from functional position as shown.

The illustrated packing assembly 200 is essentially identical in elements to the assembly 100 of FIG. 5, comprising one or more (only one shown) V-shaped seal ring elements 220, one or more (only one shown) Y-shaped backup/energizing rings 222, a spring-energized lip seal ring 224, and an adapter ring 226 having a T-shaped cross-sectional configuration. An adapter ring 228 is also included to bear against the seal ring 220, but instead the junk ring 210 could be suitably configured and dimensioned to provide the additional function of the ring 228 if desired. The packing assembly 200 responds to internal pressure, in this case in the wellhead 206, in the same manner as to the corresponding assemblies 10 and 100, and thus effectively seals that pressure in the bore 204.

Although the best mode contemplated for carrying out the present invention has been herein shown and described, it will be apparent that modification and variation may be made without departing from what is regarded to be the subject matter of the invention.

We claim:

1. A fluid packing assembly in the form of a stacked array for statically and dynamically sealing a cylindrical element to a surrounding cylindrical surface, said assembly comprising:

(a) at least one seal ring element having a generally V-shaped cross-sectional configuration;

(b) at least one backup/energizing ring in supportive relationship with the seal ring element, said backup/energizing ring having a generally Y-shaped cross-sectional configuration;

(c) a spring-energized lip seal ring adjacent the backup/energizing ring, said lip seal ring including a central base and a pair of sealing lips extending therefrom whereby the lip seal ring has a generally U-shaped cross-sectional configuration; and (d) an adapter ring having a generally T-shaped cross-sectional configuration and extending into a supportive relationship with the lip seal ring to prevent dislocation of said seal ring when the packing assembly is in functional position between said cylindrical element and said surrounding cylindrical surface.

2. A fluid packing assembly according to claim 1 including a second adapter ring in supportive relationship with the seal ring element.

3. A fluid packing assembly according to claim 2 wherein the second adapter ring has a radial face that is generally V-shaped in cross-sectional configuration and that resides against the seal ring element.

4. A fluid packing assembly according to claim 1 wherein the radial surface of the seal ring element and the opposing radial surface of the backup/energizing ring define an annular void that disappears when the packing assembly is properly installed in functional position between a properly sized cylindrical element and a properly sized surrounding cylindrical surface.

5. A fluid packing assembly according to claim 1 wherein the backup/energizing ring and the adjacent seal ring element are caused to migrate into a fluid-tight seal with said cylindrical element and said surrounding cylindrical surface in response to an axial piston-like force exerted by the lip seal ring.

6. A fluid packing assembly according to claim 1 wherein the cylindrical element is a fluid choke stem, and the surrounding cylindrical surface is on a fluid choke bonnet component.

7. A fluid packing assembly according to claim 1 wherein the cylindrical element is a wellhead lockdown screw, and the surrounding cylindrical surface is a port in a wellhead.

* * * * *